(12) United States Patent
Noda

(10) Patent No.: US 9,858,287 B2
(45) Date of Patent: Jan. 2, 2018

(54) STORAGE SYSTEM

(75) Inventor: Kenji Noda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 13/981,166

(22) PCT Filed: Nov. 30, 2011

(86) PCT No.: PCT/JP2011/006679
§ 371 (c)(1),
(2), (4) Date: Sep. 4, 2013

(87) PCT Pub. No.: WO2012/101707
PCT Pub. Date: Aug. 2, 2012

(65) Prior Publication Data
US 2013/0339320 A1    Dec. 19, 2013

(30) Foreign Application Priority Data

Jan. 28, 2011    (JP) ................. 2011-016229

(51) Int. Cl.
*G06F 7/00* (2006.01)
*G06F 17/00* (2006.01)
(Continued)

(52) U.S. Cl.
CPC ...... *G06F 17/30156* (2013.01); *G06F 3/0619* (2013.01); *G06F 3/0641* (2013.01);
(Continued)

(58) Field of Classification Search
CPC ......... G06F 17/30241; G06F 17/30368; G06F 17/30097
(Continued)

(56) References Cited

U.S. PATENT DOCUMENTS 4,888,698 A * 12/1989 Driessen et al. ............... 701/532
5,559,991 A *  9/1996 Kanfi ............................ 711/162
(Continued)

FOREIGN PATENT DOCUMENTS

CN        1629823 A    6/2005
CN      101799788 A    8/2010
(Continued)

OTHER PUBLICATIONS

International Search Report of PCT/JP2011/006679 dated Dec. 27, 2011.
(Continued)

*Primary Examiner* — James Trujillo
*Assistant Examiner* — John J Morris
(74) *Attorney, Agent, or Firm* — Sughrue Mion, PLLC

(57) ABSTRACT

The storage system includes a data dividing means for dividing writing target data into a plurality of units of partial data, and generating units of new divided file data; an index file generation means for generating, for each of the units of partial data, an index entry, and generating index file data by adding test data for error detection; a data writing means for writing the divided file data and the index file data; and a recovery means for detecting an error in the index entries written in the storage device, based on the test data included in each of the index entries. The recovery means deletes an index entry in which an error is detected and all of the subsequent index entries in the index file data stored in the storage device, from the index file data.

5 Claims, 12 Drawing Sheets

(51) Int. Cl.
　　　*G06F 17/30*　　　(2006.01)
　　　*G06F 3/06*　　　(2006.01)
　　　*G06F 11/10*　　　(2006.01)
　　　*G06F 11/14*　　　(2006.01)
(52) U.S. Cl.
　　　CPC ........ *G06F 3/0682* (2013.01); *G06F 11/1004* (2013.01); *G06F 11/1453* (2013.01)
(58) Field of Classification Search
　　　USPC ........... 707/692, 999.202, 999.204; 701/532; 711/162
　　　See application file for complete search history.

(56) References Cited

U.S. PATENT DOCUMENTS

| | | | |
|---|---|---|---|
| 5,978,814 | A | 11/1999 | Miller et al. |
| 6,668,262 | B1 * | 12/2003 | Cook |
| 2002/0129042 | A1 * | 9/2002 | Bradshaw ................. G06F 8/71 |
| 2010/0082672 | A1 | 4/2010 | Kottomtharayil et al. |

FOREIGN PATENT DOCUMENTS

| | | |
|---|---|---|
| EP | 2 144 177 A2 | 1/2010 |
| JP | 06-175901 A | 6/1994 |
| JP | 06-290092 A | 10/1994 |
| JP | 07-146810 A | 6/1995 |
| JP | 2002-501258 A | 1/2002 |
| JP | 2005-235171 A | 9/2005 |
| JP | 4283440 B2 | 6/2009 |

OTHER PUBLICATIONS

Communication dated Apr. 14, 2015 from The State Intellectual Property Office of the P.R.C. in counterpart application No. 201180066195.4.

Communication dated Sep. 18, 2017 from the European Patent Office in counterpart Application No. 11856977.1.

\* cited by examiner

Fig.4

| · originalFile_offset | |
|---|---|
| · current_File | |
| · fileA_offset | |
| · fileB_offset | |
| · data_size | |
| · index_sync | |

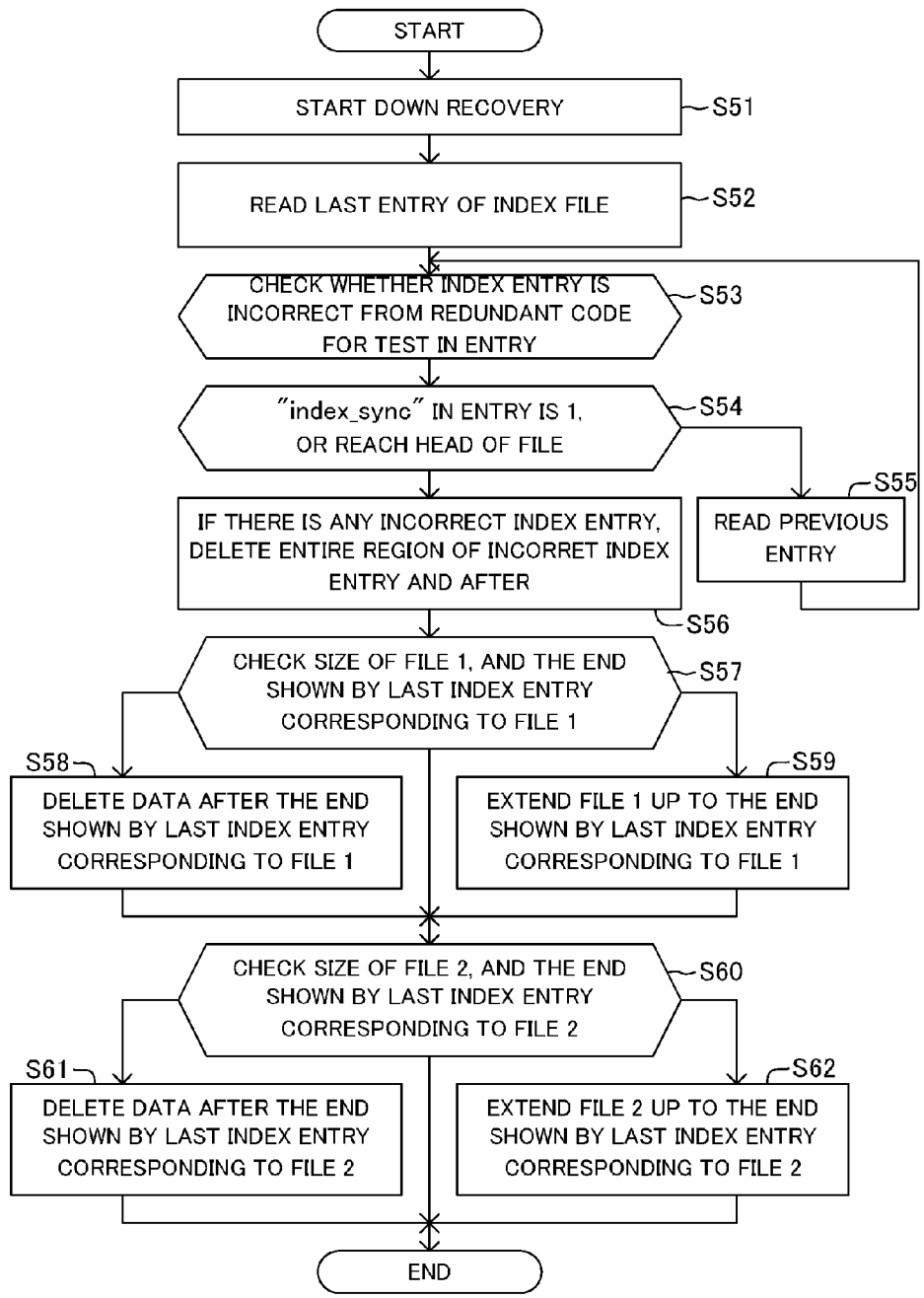

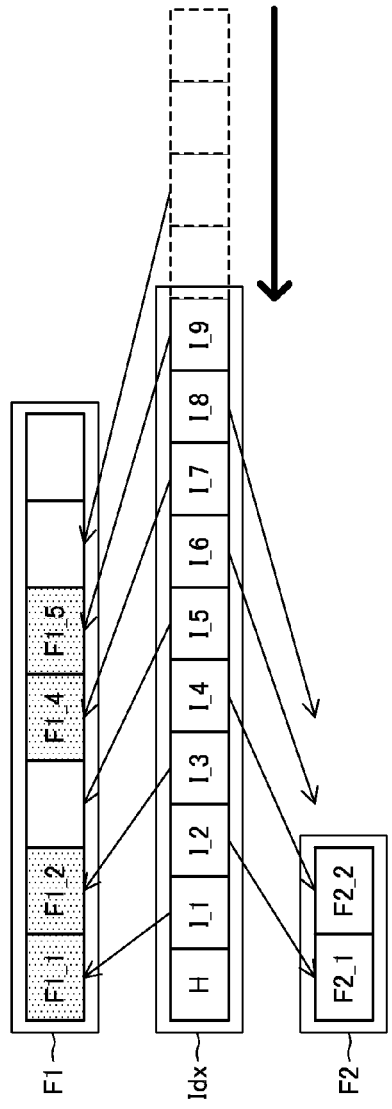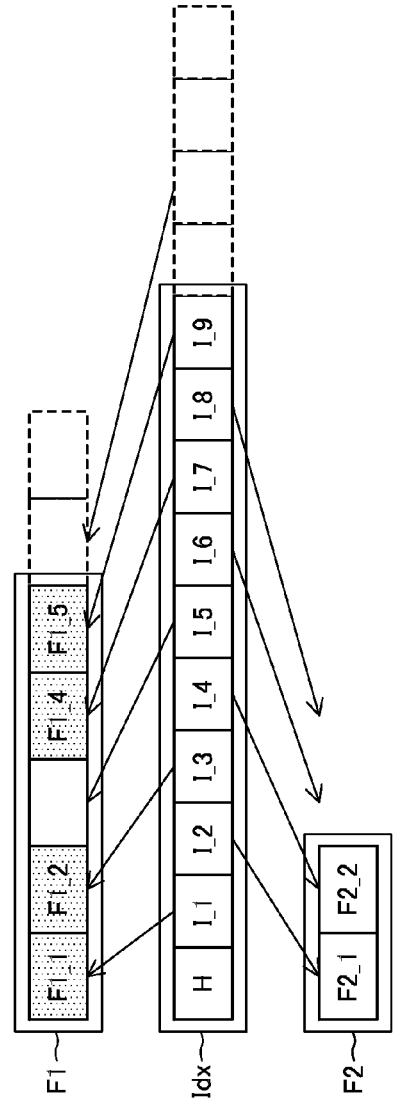

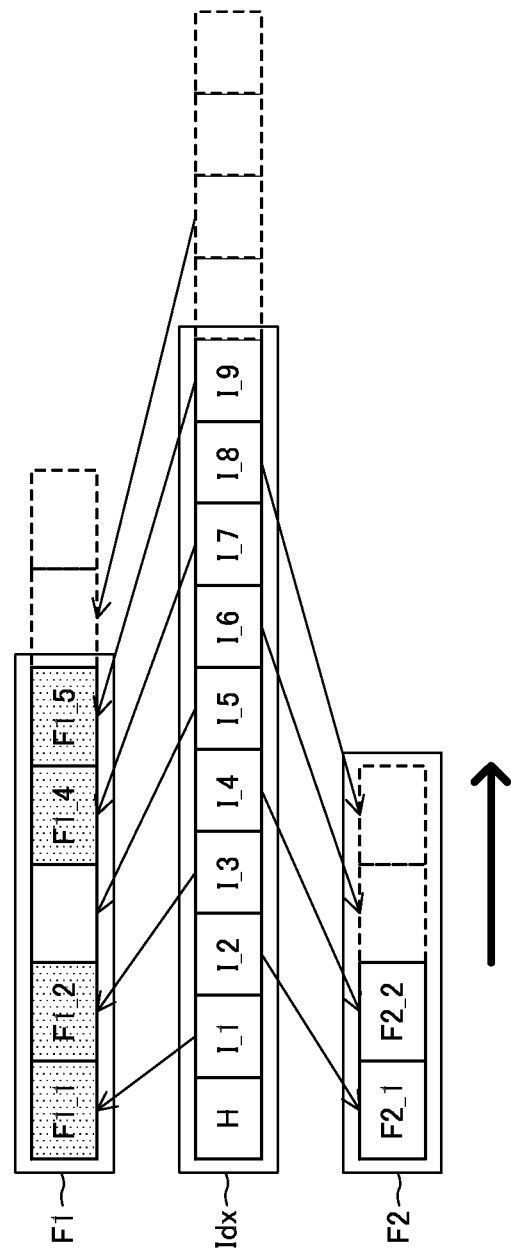

STORAGE SYSTEM

CROSS REFERENCE TO RELATED APPLICATIONS

This is a National Stage of International Application No. PCT/JP2011/006679 filed Nov. 30, 2011, claiming priority based on Japanese Patent Application No. 2011-016229 filed Jan. 28, 2011, the contents of all of which are incorporated herein by reference in their entirety.

TECHNICAL FIELD

The present invention relates to a storage system which divides data to be stored and stores the data in a storage device.

BACKGROUND ART

In recent years, along with the development and the spread of computers, various kinds of information are put into digital data. As devices for storing such digital data, storage devices such as a magnetic tape and a magnetic disk have been known. As data to be stored has increased day by day and the amount thereof has become huge, a large-capacity storage system is required. Moreover, it is required to keep reliability while reducing the cost for storage devices. In addition, it is also required that data can be easily retrieved later. As a result, a storage system capable of automatically increasing the storage capacity and the performance thereof and eliminating duplicated storage content to reduce the cost for storage, with high redundancy, is desired.

Under such circumstances, a content address storage system has been developed recently as shown in Patent Document 1. This content address storage system distributedly stores data into a plurality of storage devices, and specifies a storing position where the data is stored based on a unique content address specified corresponding to the content of the data. To be specific, the content address storage system divides predetermined data into a plurality of fragments, adds a fragment as redundant data thereto, and stores these fragments into a plurality of storage devices, respectively.

Later, by designating a content address, it is possible to read data, namely, a fragment, stored in a storing location specified by the content address, and recover predetermined data before the division from a plurality of fragments.

Further, as the content address, a hash value of data, which is generated so as to be unique corresponding to the content of data, is used. As such, in the case of duplicated data, it is possible to acquire data of the same content with reference to the data in the same storing position. Accordingly, it is not necessary to separately store duplicated data, whereby it is possible to eliminate duplicated records and reduce the data capacity.

A storage system having the above-described duplicated record elimination function includes an upper-level file system and a lower-level file system, with the following characteristics:

The upper-level file system divides a written file into a plurality of files internally.
The divided files are written from the upper-level file system to a lower-level file system respectively, and are synchronized with a stable storage device by the lower-level file system.
The lower-level file system does not ensure the writing sequence of the data. As such, if system down occurs in the process of data writing, a part of the data might be dropped.

FIG. 1 shows a state where a file F is divided into two by file division. First, the upper-level file system generates a file 1 (F1) and a file 2 (F2) by dividing the file F into a plurality of units of partial data (F1_1, F2_2, etc.), and also generates an index file Idx which records mapping information of the original written file F and the file 1 (F1) and the file 2 (F2) generated by the division. The index file Idx has mapping information of each of the divided units of partial data (F1_1, F2_2, etc.) as an index entry (I-1, etc.).

The mapping information in the index entry mainly includes the following information:
Information of a corresponding file.
Offset information from the head of the file in the file before the division.
Offset information from the head of the file in the divided file.
Data size information.

As an example in which a file system that divides a file as described above is used, software for data backup has been known. In backup software, backup data is divided into a "data part" and a "marker part" inserted by the backup software, at the upper level of the file system. In general, determination of data deduplication is performed in such a manner that data of a file is sectioned to have a given length (fixed length or variable length) and that units of the sectioned data are compared. As such, if there is a difference of data in one file in a space smaller than the length of the sectioned file, such portions of data are not determined to be the same content data. This means that even if there are portions of data of the same content between the sectioned units of data, if there is a slight difference, both sectioned units of data are stored, whereby deduplication of data to be stored cannot be performed efficiently. Further, in the software for data backup, there is a case where unique information is inserted for each backup such as a backup time, besides the data to be backed up, and such a marker part is obstructive to the deduplication between respective full backups.

Accordingly, as described above, by dividing backup data into a "data part" and a "marker part" at the upper level of a file system, it is possible to improve the effect of deduplication of backup data on the "data part" side. In particular, in the case of acquiring full backups for several generations, as it is expected that duplicated portions are significantly large between respective full backups, it is possible to further improve the deduplication function, whereby the storage region can be reduced with high efficiency.

Patent Document 1: JP 2005-235171 A

However, in such a file system, if system down occurs in the process of data writing, there is a case where each of the divided files becomes an incomplete state, like portions not indicated by reference signs in FIG. 2, for example. Particularly, among the divided files, an index file Idx which records mapping information of the respective files is an important file, and if the content thereof becomes incomplete, data accessing cannot be performed normally.

Accordingly, an object of the present invention is to provide a storage system which solves the above-described problem, that is, a disadvantage that it becomes impossible to perform data accessing normally in a file system.

In order to achieve the above-described object, a storage system, which is an aspect of the present invention, is configured to include a data dividing means for dividing data, to be written into a given storage device, into a plurality of units of partial data, sorting the units of the partial data into a plurality of classifications according to a predetermined criterion, and for each of the classifications, generating new divided file data by linking the units of the partial data;

an index file generation means for generating, for each of the units of the partial data, an index entry including location information in the data to be written before division of the units of the partial data and location information in the divided file data generated after the division of the units of the partial data, adding test data for error detection to the index entry, and generating index file data by linking a plurality of the index entries;

a data writing means for writing the divided file data generated by the data dividing means, and the index file data generated by the index file generation means, into the storage device; and a recovery means for detecting an error in the index entries written in the storage device, based on the test data included in each of the index entries, wherein the recovery means deletes an index entry in which an error is detected and all of subsequent index entries in the index file data stored in the storage device, from the index file data.

Further, a program, which is another aspect of the present invention, is a program for causing an information processing device to realize:

a data dividing means for dividing data, to be written into a given storage device, into a plurality of units of partial data, sorting the units of the partial data into a plurality of classifications according to a predetermined criterion, and for each of the classifications, generating new divided file data by linking the units of the partial data;

an index file generation means for generating, for each of the units of the partial data, an index entry including location information in the data to be written before division of the units of the partial data and location information in the divided file data generated after the division of the units of the partial data, adding test data for error detection to the index entry, and generating index file data by linking a plurality of the index entries;

a data writing means for writing the divided file data generated by the data dividing means, and the index file data generated by the index file generation means, into the storage device; and a recovery means for detecting an error in the index entries written in the storage device, based on the test data included in each of the index entries, wherein the recovery means deletes an index entry in which an error is detected and all of subsequent index entries in the index file data stored in the storage device, from the index file data.

Further, an information processing method, which is another aspect of the present invention, is configured to include, in an information processing device:

dividing data, to be written into a given storage device, into a plurality of units of partial data, sorting the units of the partial data into a plurality of classifications according to a predetermined criterion, and for each of the classifications, generating new divided file data by linking the units of the partial data;

generating, for each of the units of the partial data, an index entry including location information in the data to be written before division of the units of the partial data and location information in the divided file data generated after the division of the units of the partial data, adding test data for error detection to the index entry, and generating index file data by linking a plurality of the index entries;

writing the divided file data and the index file data into the storage device; and detecting an error in the index entries written in the storage device, based on the test data included in each of the index entries, and deleting an index entry in which an error is detected and all of subsequent index entries in the index file data stored in the storage device, from the index file data.

As the present invention is configured as described above, even if data written in a storage device becomes incomplete due to system down or the like, subsequent data accessing can be performed normally.

BRIEF DESCRIPTION OF DRAWINGS

FIG. 4 shows an example of the file information table disclosed in FIG. 3.

FIG. 9 is a flowchart showing an operation of the storage system disclosed in FIG. 3.

FIG. 10 shows a state where an index file is modified in the storage system disclosed in FIG. 3.

FIG. 11 shows a state where a divided file is modified in the storage system disclosed in FIG. 3.

FIG. 12 shows a state where a divided file is modified in the storage system disclosed in FIG. 3.

EXEMPLARY EMBODIMENTS

First Exemplary Embodiment

Figure 3:
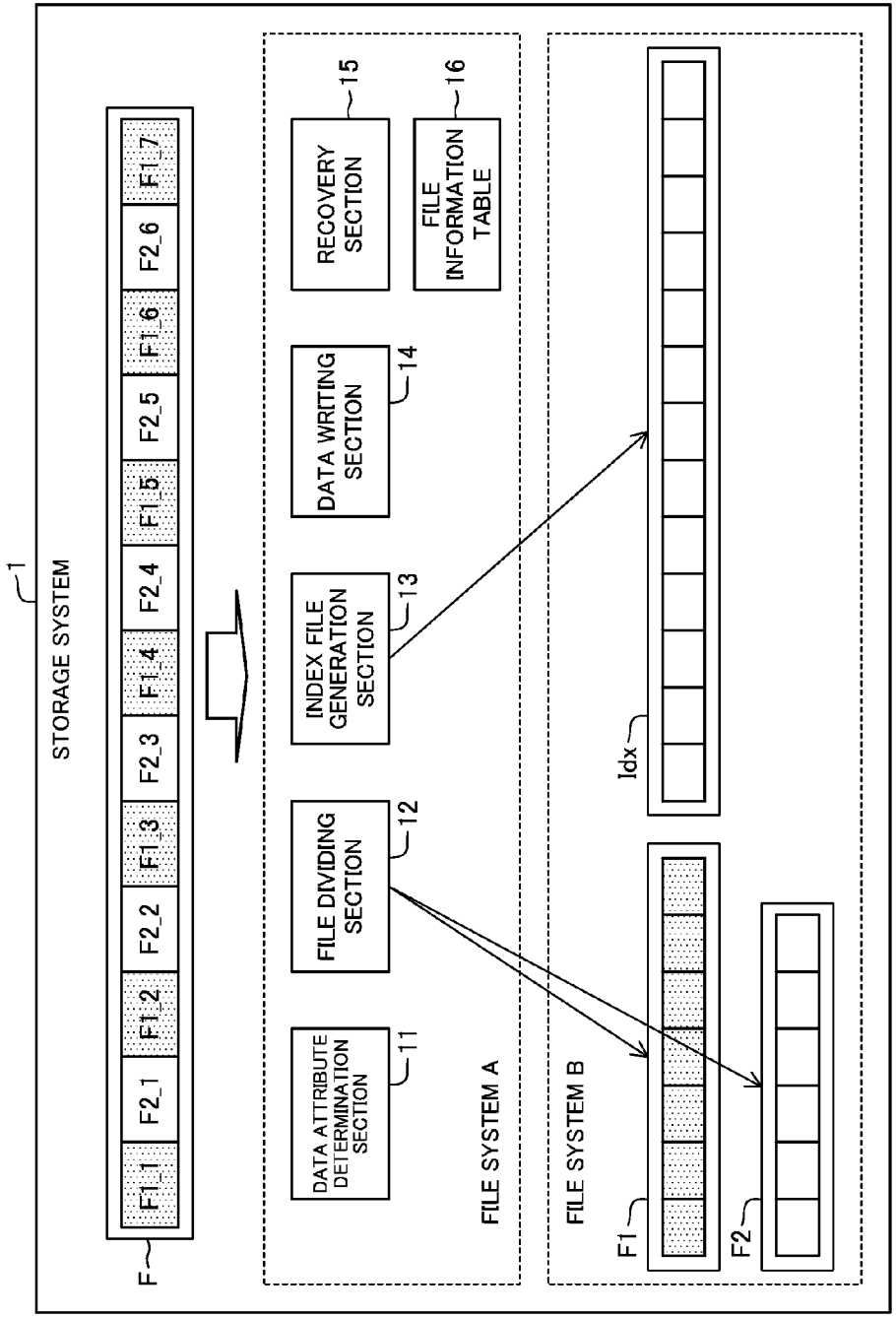
FIG. 3 shows a configuration of a storage system according to a first exemplary embodiment of the present invention.

A first exemplary embodiment of the present invention will be described with reference to FIGS. 3 to 12. FIGS. 3 and 4 are drawings for explaining a configuration of a storage system according to the present embodiment, and FIGS. 5 to 12 are drawings for explaining the operation of the storage system.

[Configuration]

Figure 2:
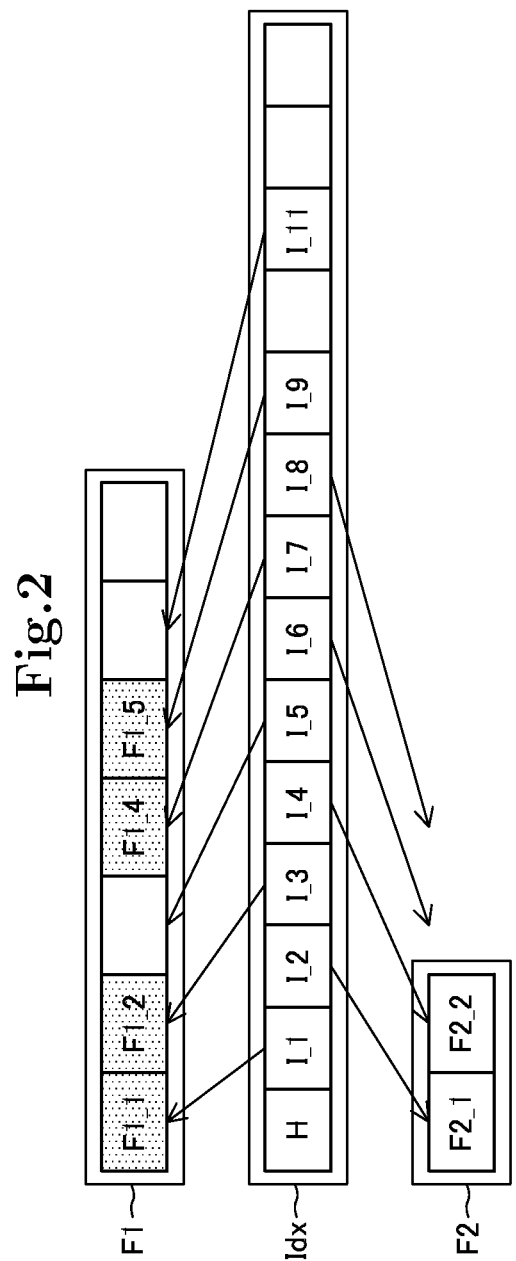
FIG. 2 shows a state where divided files written in the storage device become incomplete.

A storage system 1 of the present invention is configured of one server computer or a plurality of server computers connected with each other. As shown in FIG. 2, the storage system 1 includes two file systems, namely a file system A and a file system B. The file system A has, for example, a function of controlling writing and reading operations of the storage system 1 itself, and the file system B has a function of actually storing data in a storage device.

It should be noted that the storage system 1 of the present embodiment is a content address storage system which divides data and makes it redundant, stores the divided units of data into a plurality of storage devices distributedly, and specifies the stored location where the data is stored according to a unique content address to be set corresponding to the content of the data to be stored. Thereby, the storage system 1 realizes deduplication of data to be stored. However, the storage system 1 of the present invention is not limited to a content address storage system, and not limited to that having a deduplication function.

The storage system 1 of the present embodiment includes, in the file system A, a data attribute determination section 11, a file dividing section 12, an index file generation section 13, a data writing section 14, and a recovery section 15, which are configured by a program being incorporated in an arithmetic unit. The storage system 1 also includes a file information table 16 formed in the main memory.

Although not shown, the storage system 1 also includes a plurality of storage devices which are accessible by the file system B. The storage system 1 has a function of further dividing the divided files F1 and F2 and the index file Idx which will be described below, making them redundant, storing them distributedly in a plurality of storage devices, and realizing deduplication.

The data attribute determination section 11 (data dividing means) determines which of the predetermined attributes (classifications) each unit of partial data in a writing target file (writing target data) belongs to. In the present embodiment, a file F which is a writing target is backup data, for example, and the data attribute determination section 11 determines that the data belongs to which of the two attributes, namely a "data part" which is the actual data part of the backup data and in which the values are not changed due to the generated time, the number of updates, and the like, and a "marker part" in which the values are changed due to the time or the number of updates such as time stamps or serial numbers and which includes management information of the file itself. It should be noted that in the data attribute determination section 11, reference information for determining the attribute has been set in advance from the data content of each unit of partial data in the file F, and the attribute is determined in accordance with such reference information.

Figure 1:
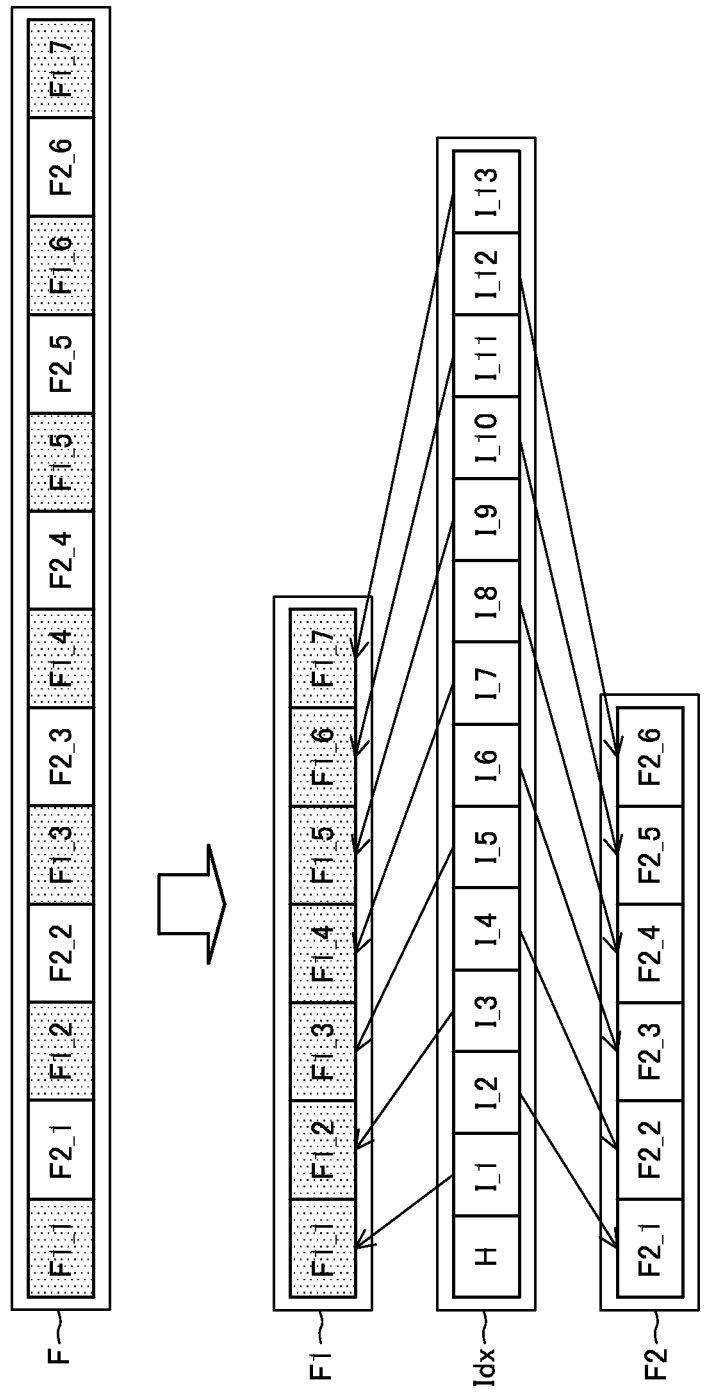
FIG. 1 shows a state where a file to be written into a storage device is divided.

The file dividing section 12 (data dividing means) divides the data of the file F into respective units of partial data according to the attributes determined by the data attribute determination section 11, sorts the units of partial data by respective attributes, and newly generates divided file data respectively. For example, in the present embodiment, the units of partial data belonging to the "data part" in the file F are sorted into the file 1 (F1) which is divided file data after the division, and the units of partial data belonging to the "marker part" are sorted into the file 2 (F2) which is divided file data after the division. Then, the sorted units of partial data are combined by each file (File 1, File 2) corresponding to each attribute. More specifically, as shown in FIG. 1, in the file F which is a writing target, the units of partial data F1_1 to F1_7 are sorted into the file 1 and the units of partial data F2_1 to F2_6 are sorted into the file 2.

Here, the processing of dividing the file F and generating the files 1 and 2 as described above is performed on the main memory in the storage system 1, and the files 1 and 2 are actually written in a storage device at the time of data synchronization of the file system A and the file system B by the data writing section 14, as described below.

While the present embodiment exemplary shows the case of dividing the writing target file F into two files, the present invention is not limited to the case where the number of files generated by division is two, and is applicable to the case where a file is divided in to a larger number of files.

When dividing the file of the file F into respective units of partial data as described above, the index file generation section 13 (index file generation means) generates index entries for respective units of partial data and links them to thereby generate an index file Idx (index file data). It should be noted that an index entry is generated using information stored in the file information table 16 for example, and as shown in FIG. 4, includes data such as "originalFile_offset" representing location information in the file F before the division of a unit of partial data corresponding to the index entry, "fileA_offset" or "fileB_offset" (offset information of a file described in "current_File") representing location information in the divided file data (file 1 or file 2) generated from the partial data, "data size" which is data size information representing the data size of the partial data itself, and "index_sync" representing whether or not synchronization with the file system B has been completed. It should be noted that while the initial set value of "index_sync" is "0", when synchronization with the file system B has been completed, the value is set to "1".

The index file generation section 13 also adds, to each of the index entries, test data for error detection to be used for detecting irregularities in the index entries. This test data is a redundant code such as "CRC32" for example, but the test data is not limited to such data.

The data writing section 14 (data writing means) writes the file 1 and the file 2 which are divided file data generated by the file dividing section 12, and the index file Idx generated by the index file generation section 13, into the file system B. Specifically, the data writing section 14 actually writes the files 1 and 2 and the index file Idx generated on the main memory in the storage system 1 into an auxiliary storage device at the time of data synchronization between the file system A and the file system B. In particular, when writing of the index entries into the auxiliary storage device has been completed, the data writing section 14 sets "index_sync" to "1", and adds specific information.

During the time when the data writing section 14 writes the file 1, file 2, and the index file Idx into the auxiliary storage device, if system down occurs because of occurrence of a failure in the storage system 1 itself or in the file system B, the recovery section 15 (recovery means) performs recovery processing such as checking and restoration of the data when the data written in the auxiliary storage device is accessed next time.

To be specific, the recovery section 15 performs error detection processing by checking the test data for error detection stored in each of the index entries in the index file Idx. If the recovery section 15 detects an error in any index entry, the recovery section 15 performs modification to delete, from the index file Ids, such an index entry and all of the subsequent index entries located closer to the end from such an index entry. In this process, the recovery section 15 performs error detection processing of index entries in sequence from the end to the beginning of the index file Idx, and also performs back read to check the value of the "index_sync" in each of the index entries. If the "index_sync" in any of the index entries is "1", the recovery section 15 ends the error detection processing performed in sequence from the end of the index file Idx, that is, back read. It should be noted that the recovery section 15 also ends the back read when the reading reaches the first entry of the index file Idx during the back read.

Further, upon completion of checking and modification of the respective index entries as described above, the recovery section 15 specifies the file sizes of the file 1 and the file 2 which are divided files, from the information in the index entry located at the end of the index file Idx after the modification. Then, the recovery section 15 checks whether the specified file sizes of the specified files 1 and 2 and the file sizes of the actual files 1 and 2 conform with each other, and extends or deletes the end of the files 1 and 2 in order that the actual file sizes of the file 1 and the file 2 conform to the file sizes specified from the index entry. The specific content of the processing will be described below.

[Operation]

Next, operation of the storage system 1 will be described with reference to the flowcharts of FIGS. 5 to 9 and FIGS. 10 to 12.

First, with reference to FIG. 5, file division and generation of an index file by the storage system 1 will be described. When writing the file F into the file system A, the storages system 1 initializes the file information table 16 (step S1) and generates a file, and writes various types of information such as inode number and the like with respect to the file as a header in the index file Idx (step S2). Then, when the file F is written (step S3), the data attribute determination section 11 checks the data attribute of each of the units of partial data, and writes the data attribute on "current_File" in the file information table 16 (step S4), and the file dividing section 12 writes respective units of partial data into the respective files 1 and 2 corresponding to the data attributes (step S5).

Then, each time the storage system 1 writes data from the file F (step S6), the storage system 1 determines the data attribute (step S7) and starts writing of the data (step S11). In this process, if the attribute of a unit of partial data determined by the data attribute determination differs from that of a unit of partial data immediately before (No at step S8), the index file generation section 13 generates an index entry. The storage system 1 writes the index entry on the index file Idx (step S9), and updates "current_File" (step S10).

Then, when writing of all units of partial data in the file F has completed (step S11, Yes at step S12), the storage system 1 finally writes the index entry (step S13). Such writing is performed on the main memory, and the data is actually stored in an auxiliary storage device at the time of synchronization to be performed later.

Figure 5:
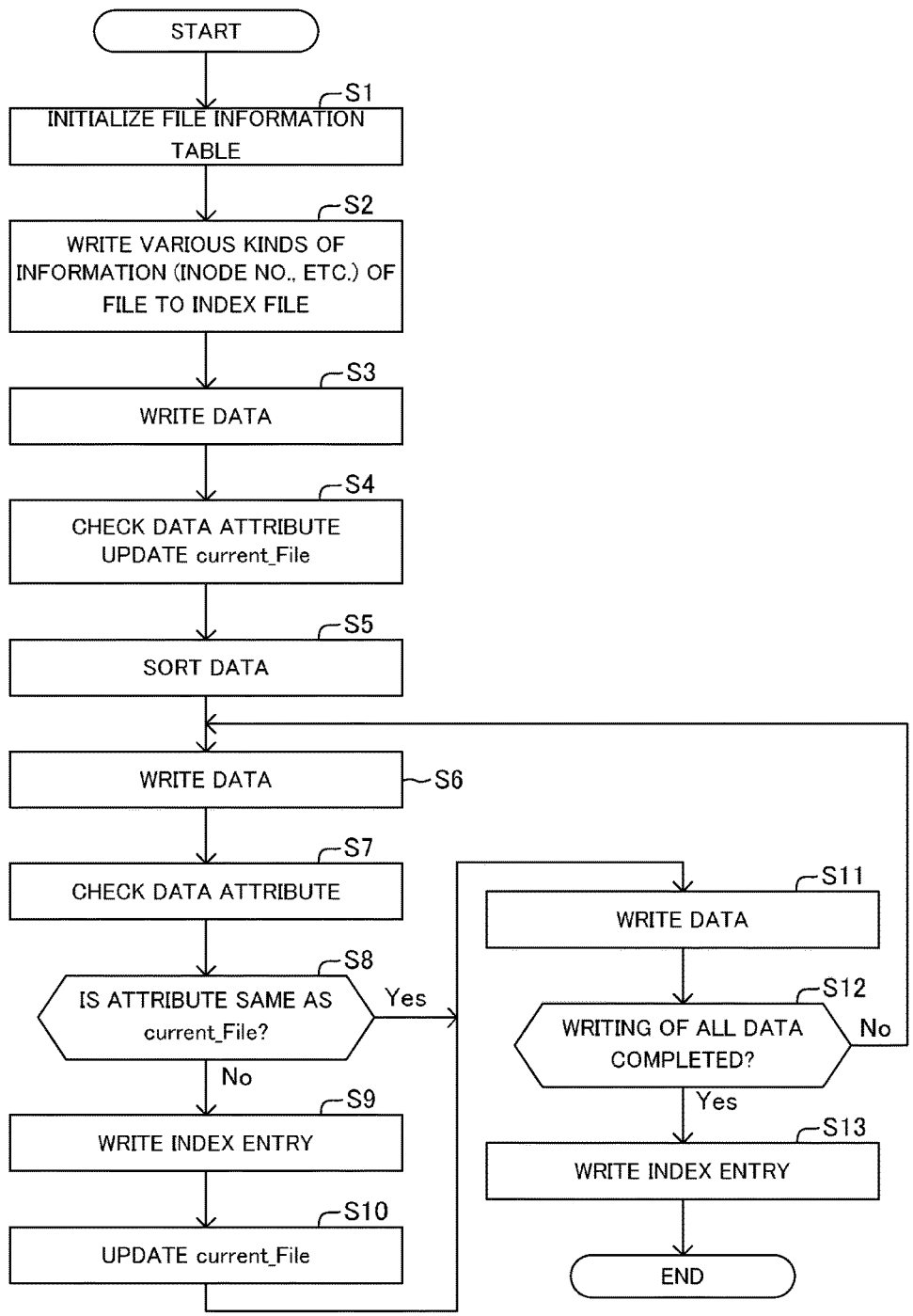
FIG. 5 is a flowchart showing an operation of the storage system disclosed in FIG. 3.
Figure 6:
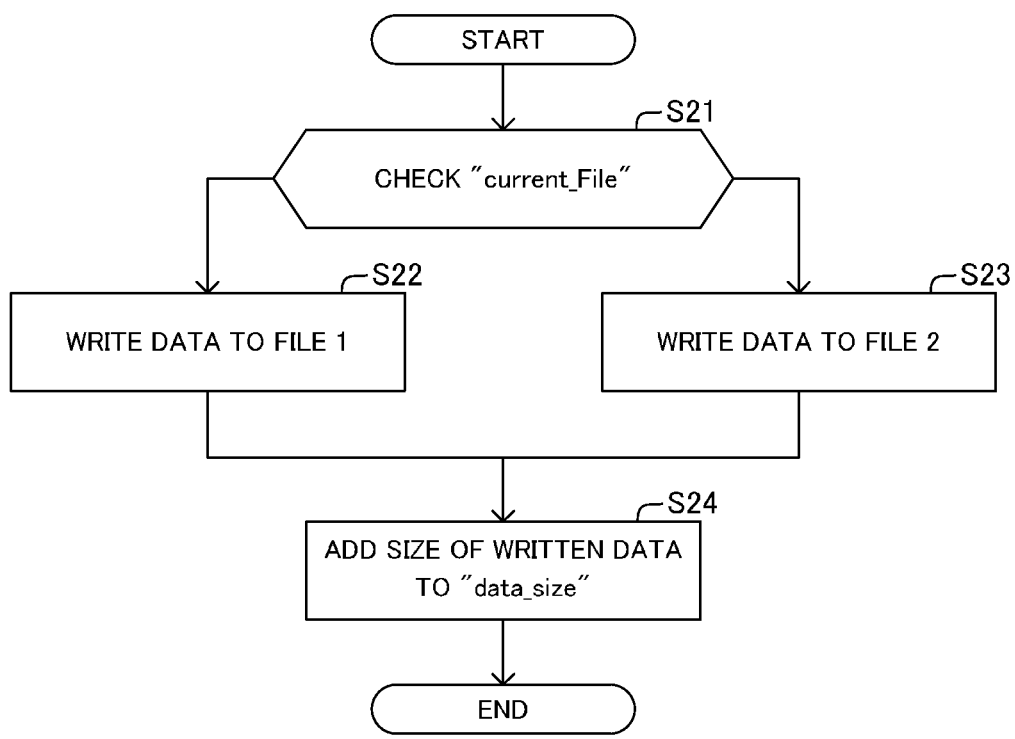
FIG. 6 is a flowchart showing an operation of the storage system disclosed in FIG. 3.

Next, data writing processing at step S5 and step S11, as shown in FIG. 5, will be described with reference to the flowchart of FIG. 6. The file dividing section 12 writes, in accordance with "current_File" in the file information table 16 (step S21), partial data of the file F into the file 1 or the file 2 of the file system B (steps S22, S23), and adds the size of the written partial data to the "data_size" in the file information table 16 (step S24).

Figure 7:
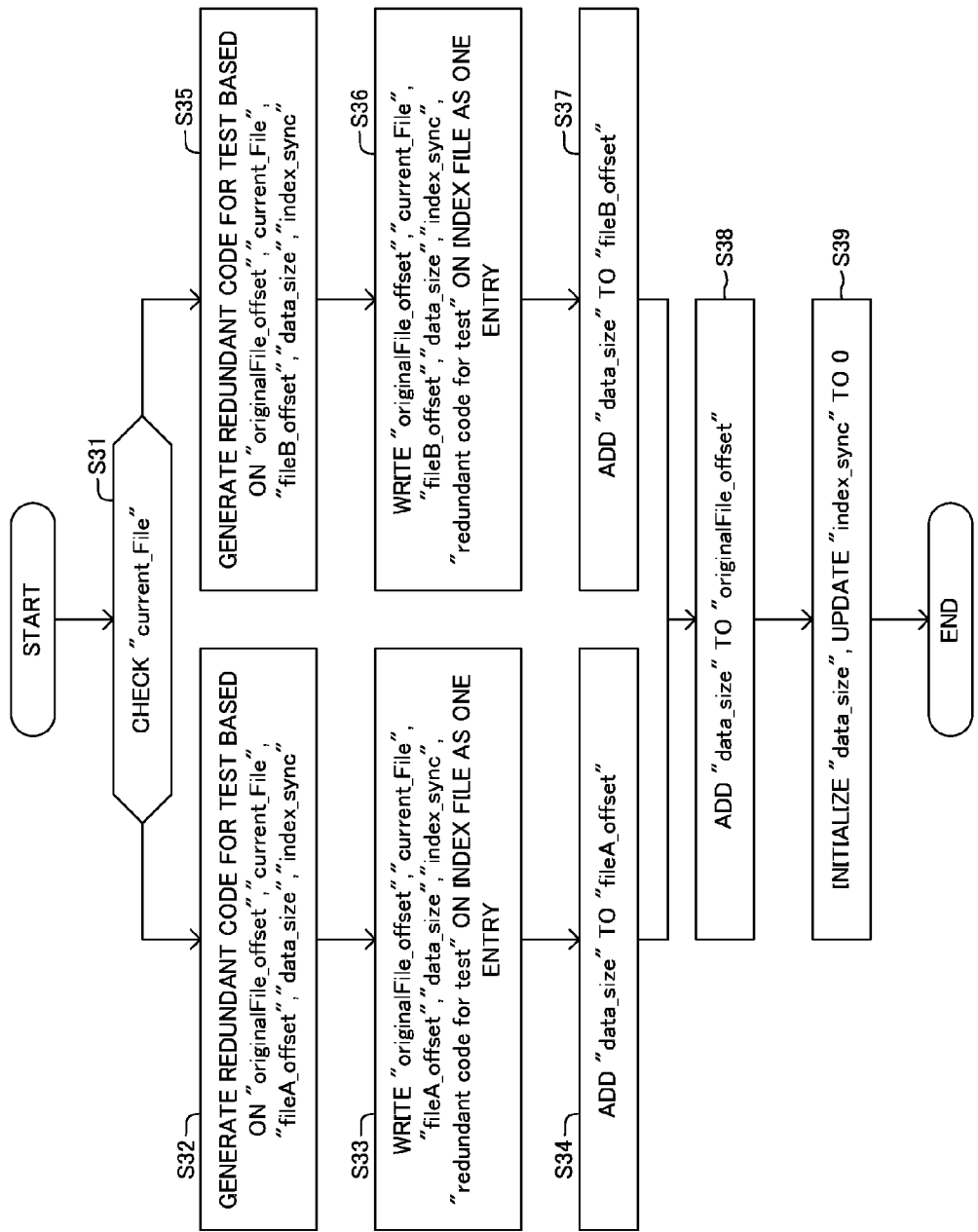
FIG. 7 is a flowchart showing an operation of the storage system disclosed in FIG. 3.

Next, index entry writing processing at step S9, as shown in FIG. 5, will be described with reference to the flowchart of FIG. 7. As described above, if the attribute of a unit of partial data of the file F is changed, an index entry is written. In this process, "current_File" in the file information table 16 is checked (step S31), and based on the respective pieces of information in the file information table 16, a redundant code for testing is calculated (steps S32, S35). Then, the respective pieces of information and the redundant code for testing are written as one index entry on the index file Idx of the file system B (step S33, S34). After the index entry is written on the index file Idx, "data_size" is added to "fileA_offset" or "fileB_offset (offset information of the file described in "current_File") and "originalFile_offset" (steps S34, S37, and S38), and "index_sync" is set to 0 (step S39).

Figure 8:
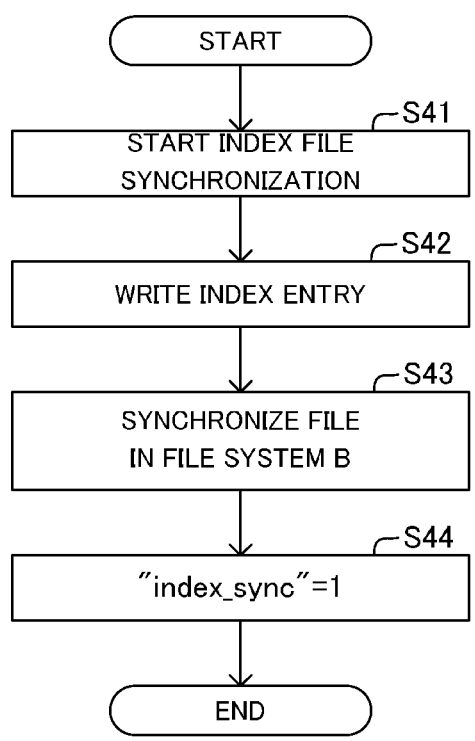
FIG. 8 is a flowchart showing an operation of the storage system disclosed in FIG. 3.

Next, data synchronization processing when a data synchronization command is issued to the file system A, that is, an operation of actually writing data of the files 1 and 2 and the index file Idx, generated as described above, from the main memory to an auxiliary storage device, will be described with reference to the flowchart of FIG. 8.

When a data synchronization command is executed (step S41), index entries are written (step S42), and a data synchronization command is issued with respect to all of the files of the file system B (step S43). Finally, "index_sync" in the file information table 16 is set to "1" (step S44). Thereby, "index_sync" in the index entry generated immediately after the data synchronization is "1", while the others are "0".

If system down occurs in the process of data writing to the file system B during the data synchronization, recovery processing will be performed at the time of the next access to the file F. This recovery processing will be described with reference to the flowchart of FIG. 9 and FIGS. 10 to 12.

In the recovery processing (step S51), as shown in FIG. 10, the index entries in the index file Idx are read back from the end of the index file Idx (step S52). Then, with use of the redundant code for testing each of the index entries, it is checked whether there is any incorrect index entry (step S53). In this process, it is also checked whether "index_sync" in an index entry is "1", or the back read reaches the head of the index file Idx (step S54). If the reading does not reach the head, the previous entry is read (step S55), and the same processing is performed.

During the back read, if "index_sync" in an index entry is "1" or the back read reaches the head of the index file Idx, the back read is ended (step S54). In this process, if there is any incorrect index entry, all of the subsequent index entries, namely the index entries from the incorrect one to the end of the index file Idx, are deleted (step S56). For example, if "index_sync" of the index entry of the reference sign I_9 shown in FIG. 10 is "1" and the index entry of the right side thereof, which is closer to the end, is incorrect, the index entries of the dotted portions located closer to the end from the index entry of the reference sign I_9 are deleted as shown by an arrow in FIG. 10.

It should be noted that if "index_sync" in an index entry is "1", it is ensured that respective files before such index entry (file 1, file 2, index file) are synchronized. Accordingly, there is no need to check whether or not the index entries before it are incorrect, and there is no need to perform back read. As described above, by adding "index_sync" to the index entries, it is possible to shorten the back read section.

Then, when checking and modification of the index entries have been completed, it is checked whether there is any difference between the data size of each of the files 1 and 2 and the end of the region indicated by the normal last index entry corresponding to each of the files 1 and 2 (step S57). For example, the size of the file 1 is specified based on the location information in the file 1 and the data size included in the index entry of the reference sign I_9 located at the end of the normal portion of the index file shown in FIG. 11, and it is compared with the size of the actual file 1. If the size of the actual file 1 is larger than the size specified from the last index entry, incomplete data located after the end shown by the reference sign F1-5 of the actual file 1 corresponding to the last index entry is deleted to thereby cut the file 1. This means that the partial data shown by the dotted lines in FIG. 11, which is the end portion of the file 1, is deleted as shown by an arrow up to the size specified from the last index entry (step S58).

On the other hand, if the size of the actual file 1 is smaller than the size specified from the last index entry, the end of the file 1 is extended up to the size specified by the normal last index entry (step S59).

Then, with respect to the file 2, it is also checked whether there is any difference between the data size of the file 2 and the end of the region indicated by the normal last index entry corresponding to the file 2, in a similar manner (step S60). For example, the size of the file 2 is specified based on the location information in the file 2 and the data size included in the index entry of the reference sign I_8 located at the end of the normal portion of the index file corresponding to the file 2 shown in FIG. 11, and it is compared with the size of the actual file 2. If the size of the actual file 2 is larger than the size specified from the last index entry, incomplete data located after the end of the actual file 2 corresponding to the last index entry is deleted to thereby cut the file 2 (step S61).

On the other hand, if the size of the actual file 2 is smaller than the size specified from the last index entry (reference sign I_8) corresponding to the file 2, the end of the file 2 is extended up to the size specified by the normal last index entry as shown by the dotted lines and an arrow in FIG. 12 (step S62).

As the storage system of the present invention is configured as described above, even if system down occurs during writing, consistency between files of the file 1, the file 2, and the index file can be maintained, whereby the next access to the corresponding file can be performed normally.

<Supplementary Notes>

Figure 13:
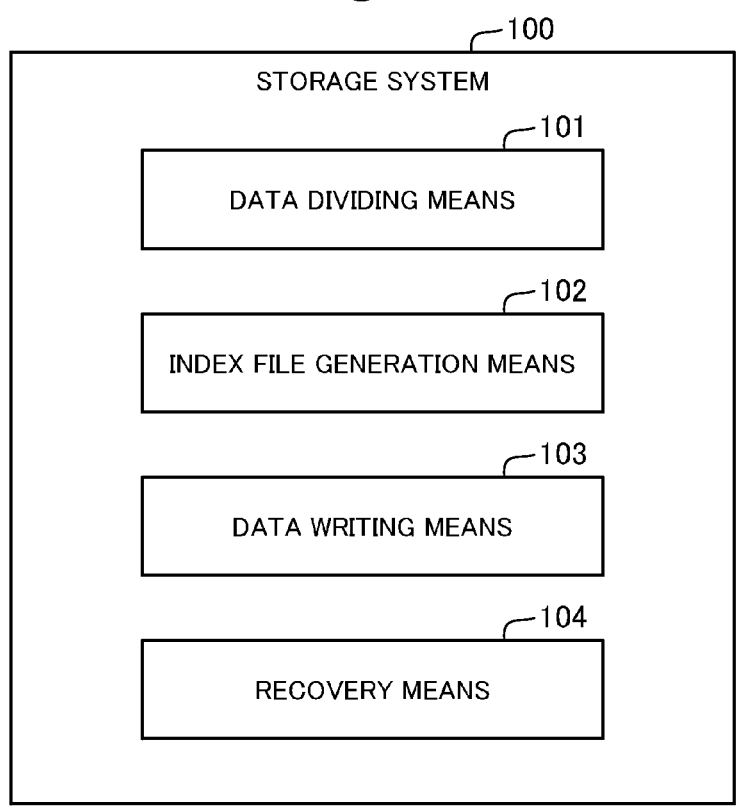
FIG. 13 shows a configuration of a storage system according to supplementary note 1 of the present invention.

The whole or part of the exemplary embodiments disclosed above can be described as, but not limited to, the following supplementary notes. Hereinafter, the outlines of the configuration of a storage system according to the present invention will be described with reference to FIG. 13. However, the present invention is not limited to the configuration described below.

(Supplementary Note 1)

A storage system 100 comprising:

a data dividing means 101 for dividing data, to be written into a given storage device, into a plurality of units of partial data, sorting the units of the partial data into a plurality of classifications according to a predetermined criterion, and for each of the classifications, generating new divided file data by linking the units of the partial data;

an index file generation means 102 for generating, for each of the units of the partial data, an index entry including location information in the data to be written before division of the units of the partial data and location information in the divided file data generated after the division of the units of the partial data, adding test data for error detection to the index entry, and generating index file data by linking a plurality of the index entries;

a data writing means 103 for writing the divided file data generated by the data dividing means, and the index file data generated by the index file generation means, into the storage device; and a recovery means 104 for detecting an error in the index entries written in the storage device, based on the test data included in each of the index entries, wherein the recovery means deletes an index entry in which an error is detected and all of subsequent index entries in the index file data stored in the storage device, from the index file data.

(Supplementary Note 2)

The storage system, according to supplementary note 1, wherein the recovery means performs error detection processing on the index entries in the index file data stored in the storage device, in sequence from the end of the index file data.

(Supplementary Note 3)

The storage system, according to supplementary note 2, wherein the data writing means stores, in the storage device, an index entry having been written in the storage device, among the index entries in the index file data, while adding specific information to the index entry, and when the recovery means performs the error detection processing on the index entries in sequence from the end of the index file data, if the specific information is added to any of the index entries, the recovery means stops the error detection processing performed on the index entries.

(Supplementary Note 4)

The storage system, according to any of supplementary notes 1 to 3, wherein the index file generation means allows each of the index entries to include data size information representing a data size of a unit of the partial data corresponding to the index entry, and the recovery means modifies a file size of the divided file data based on information included in an index entry located at the end of the index file data having been recovered after deletion of the index entry in which an error was detected and all of the subsequent index entries.

(Supplementary Note 5)

The storage system, according to supplementary note 4, wherein the recovery means extends or deletes the end of the divided file data such that the file size of the divided file data conforms to a file size, the file size being information included in the index entry located at the end of the recovered index file data, and being specified by location information in the divided file data in which the unit of the partial data corresponding to the index entry is included, and the data size information of the unit of the partial data.

(Supplementary Note 6)

A program for causing an information processing device to realize:

a data dividing means for dividing data, to be written into a given storage device, into a plurality of units of partial data, sorting the units of the partial data into a plurality of classifications according to a predetermined criterion, and for each of the classifications, generating new divided file data by linking the units of the partial data;

an index file generation means for generating, for each of the units of the partial data, an index entry including location information in the data to be written before division of the units of the partial data and location information in the divided file data generated after the division of the units of the partial data, adding test data for error detection to the index entry, and generating index file data by linking a plurality of the index entries;

a data writing means for writing the divided file data generated by the data dividing means, and the index file data generated by the index file generation means, into the storage device; and a recovery means for detecting an error in the index entries written in the storage device, based on the test data included in each of the index entries, wherein the recovery means deletes an index entry in which an error is detected and all of subsequent index entries in the index file data stored in the storage device, from the index file data.

(Supplementary Note 7)

The program, according to supplementary note 6, wherein the recovery means performs error detection processing on the index entries in the index file data stored in the storage device, in sequence from the end of the index file data.

(Supplementary Note 8)

The program, according to supplementary note 7, wherein the data writing means stores, in the storage device, an index entry having been written in the storage device, among the index entries in the index file data, while adding specific information to the index entry, and when the recovery means performs the error detection processing on the index entries in sequence from the end of the index file data, if the specific information is added to any of the index entries, the recovery means stops the error detection processing performed on the index entries.

(Supplementary Note 9)

An information processing method comprising, in an information processing device:

dividing data, to be written into a given storage device, into a plurality of units of partial data, sorting the units of the partial data into a plurality of classifications according to a predetermined criterion, and for each of the classifications, generating new divided file data by linking the units of the partial data;

generating, for each of the units of the partial data, an index entry including location information in the data to be written before division of the units of the partial data and location information in the divided file data generated after the division of the units of the partial data, adding test data for error detection to the index entry, and generating index file data by linking a plurality of the index entries;

writing the divided file data and the index file data into the storage device; and detecting an error in the index entries written in the storage device, based on the test data included in each of the index entries, and deleting an index entry in which an error is detected and all of subsequent index entries in the index file data stored in the storage device, from the index file data.

(Supplementary Note 10)

The information processing method, according to supplementary note 9, further comprising performing error detection processing on the index entries in the index file data stored in the storage device, in sequence from the end of the index file data.

(Supplementary Note 11)

The information processing method, according to supplementary note 10, wherein the writing the data includes storing, in the storage device, an index entry having been written in the storage device, among the index entries in the index file data, while adding specific information to the index entry, and the performing the error detection processing on the index entries in sequence from the end of the index file data includes, if the specific information is added to any of the index entries, stopping the error detection processing performed on the index entries.

It should be noted that in the above-described exemplary embodiments, a program may be stored in a storage device or in a computer readable recording medium. For example, a recording medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2011-16229, filed on Jan. 28, 2011, the disclosure of which is incorporated herein in its entirety by reference.

DESCRIPTION OF REFERENCE NUMERALS 1 storage system
11 data attribute determination section
12 file dividing section
13 index file generation section
14 data writing section
15 recovery section
16 file information table
100 storage system
101 data dividing means
102 index file generation means
103 data writing means
104 recovery means
F file (writing target data)
F1 file 1 (divided file data)
F2 file 2 (divided file data)
Idx index file

The invention claimed is:

1. A storage system comprising:
a storage device;
a data dividing unit configured to divide data, to be written into said storage device, into a plurality of units of partial data according to attributes of the data, and for each of the attributes, generate divided file data by linking the units of the partial data;
an index data generation unit configured to generate, for each of the units of the partial data, an index entry including location information in the data to be written before division of the units of the partial data and location information in the divided file data generated after the division of the units of the partial data, add test data for error detection to each index entry, and generate index data by linking a plurality of the index entries to each index entry for which the test data is added; and
a recovery unit configured to detect an error in the index entries written in the storage device, based on the test data included in each of the index entries, wherein
the recovery unit is further configured to delete an index entry in which an error is detected and subsequent index entries located closer to an end from the index entry in which an error is detected in the index data stored in the storage device, the index data being generated by linking a plurality of the index entries, the test data being added to each of the index entries,
wherein the index data generation unit is further configured to generate each of the index entries to include data size information representing a data size of a unit of the partial data corresponding to the index entry, and
the recovery unit is further configured to modify a file size of the divided file data based on information included in an index entry located at the end of the index data having been recovered after deletion of the index entry in which an error was detected and all of the subsequent index entries, and
wherein the recovery unit is further configured to perform error detection processing on the index entries in the index data stored in the storage device, in sequence from the end of the index data.

2. The storage system, according to claim 1, wherein when the recovery unit performs the error detection processing on the index entries in sequence from the end of the index data, if specific information is added to any of the index entries, the recovery unit stops the error detection processing of the index entries.

3. The storage system, according to claim 1, wherein the recovery unit is further configured to extend or delete the end of the divided file data such that the file size of the divided file data conforms to a file size, the file size being information included in the index entry located at the end of the recovered index data, and being specified by location information in the divided file data in which the unit of the partial data corresponding to the index entry is included, and the data size information of the unit of the partial data.

4. A non-transitory computer-readable medium storing a program comprising instructions for causing an information processing device to realize:
   a storage device;
   a data dividing unit configured to divide data, to be written into said storage device, into a plurality of units of partial data according to attributes of the data, and for each of the attributes, generate divided file data by linking the units of the partial data;
   an index data generation unit configured to generate, for each of the units of the partial data, an index entry including location information in the data to be written before division of the units of the partial data and location information in the divided file data generated after the division of the units of the partial data, add test data for error detection to each index entry, and generate index data by linking a plurality of the index entries to each index entry for which the test data is added; and
   a recovery unit configured to detect an error in the index entries written in the storage device, based on the test data included in each of the index entries, wherein
   the recovery unit is further configured to delete an index entry in which an error is detected and subsequent index entries located closer to an end from the index entry in which an error is detected in the index data stored in the storage device, the index data being generated by linking a plurality of the index entries, the test data being added to each of the index entries,
   wherein the index data generation unit is further configured to generate each of the index entries to include data size information representing a data size of a unit of the partial data corresponding to the index entry, and
   the recovery unit is further configured to modify a file size of the divided file data based on information included in an index entry located at the end of the index data having been recovered after deletion of the index entry in which an error was detected and all of the subsequent index entries, and
   wherein the recovery unit is further configured to perform error detection processing on the index entries in the index data stored in the storage device, in sequence from the end of the index data.

5. An information processing method comprising, in an information processing device:
   dividing data, to be written into a given storage device, into a plurality of units of partial data according to attributes of the data, and for each of the attributes, generating divided file data by linking the units of the partial data;
   generating, for each of the units of the partial data, an index entry including location information in the data to be written before division of the units of the partial data and location information in the divided file data generated after the division of the units of the partial data, adding test data for error detection to each index entry, and generating index data by linking a plurality of the index entries to each index entry for which the test data is added; and
   detecting an error in the index entries written in the storage device, based on the test data included in each of the index entries, and deleting an index entry in which an error is detected and subsequent index entries located closer to an end from the index entry in which an error is detected in the index data stored in the storage device, from the index data, the index data being generated by linking a plurality of the index entries, the test data being added to each of the index entries;
   modifying a file size of the divided file data based on information included in an index entry located at the end of the index data having been recovered after deletion of the index entry in which an error was detected and all of the subsequent index entries; and
   performing error detection processing on the index entries in the index data stored in the storage device, in sequence from the end of the index data,
   wherein each of the index entries comprises data size information representing a data size of a unit of the partial data corresponding to the index entry.

* * * * *